(12) United States Patent
Piascik et al.

(10) Patent No.: US 6,677,069 B1
(45) Date of Patent: Jan. 13, 2004

(54) SEALLESS RADIAL SOLID OXIDE FUEL CELL STACK DESIGN

(75) Inventors: James Piascik, Randolph, NJ (US); Daniel Dalfonzo, South Plainfield, NJ (US); Jean Yamanis, Morristown, NJ (US); Estela Ong, Rolling Hills Estates, CA (US)

(73) Assignee: Hybrid Power Generation Systems, LLC, Los Angeles, CA (US)

( * ) Notice: Subject to any disclaimer, the term of this patent is extended or adjusted under 35 U.S.C. 154(b) by 501 days.

(21) Appl. No.: 09/642,746

(22) Filed: Aug. 18, 2000

(51) Int. Cl.[7] .............................. H01M 8/02; B05D 5/12
(52) U.S. Cl. ......................... 429/32; 429/39; 427/115
(58) Field of Search .............................. 429/32, 38, 39; 427/115

(56) References Cited

U.S. PATENT DOCUMENTS

| | | | |
|---|---|---|---|
| 3,526,548 A | * 9/1970 | Accorsi et al. ............ 429/38 X |
| 4,490,445 A | 12/1984 | Hsu |
| 4,629,537 A | * 12/1986 | Hsu ........................ 429/32 X |
| 4,728,584 A | 3/1988 | Isenberg |
| 4,770,955 A | 9/1988 | Ruhl |
| 4,910,100 A | 3/1990 | Nakanishi et al. |
| 4,983,472 A | * 1/1991 | Katz et al. ..................... 429/38 |
| 5,145,754 A | 9/1992 | Misawa et al. |
| 5,175,063 A | 12/1992 | Ishihara et al. |
| 5,264,300 A | 11/1993 | Barp et al. |
| 5,273,839 A | 12/1993 | Ishihara et al. |
| 5,486,428 A | 1/1996 | Gardner et al. |
| 5,549,983 A | 8/1996 | Yamanis |
| 5,589,285 A | 12/1996 | Cable et al. |
| 5,851,689 A | 12/1998 | Chen |
| 5,922,485 A | * 7/1999 | Enami ...................... 429/32 X |
| 6,051,330 A | * 4/2000 | Fasano et al. ............ 429/32 X |

\* cited by examiner

*Primary Examiner*—Stephen Kalafut
(74) *Attorney, Agent, or Firm*—Sutherland Asbill & Brennan LLP

(57) ABSTRACT

A sealless, planar fuel cell stack system, including a continuous bottom plate, a first permeable or interconnect layer, a continuous cell, a second permeable or interconnect layer, a continuous top plate, a fuel supply member, and an oxidant gas supply member, is provided. The fuel cell system of the present invention does not require glass-based sealants to seal its planar components. In the present system, the continuous cell of the system is supported by the first permeable layer. The second permeable layer is supported by the continuous cell. The fuel supply member supplies fuel into the first permeable layer. The fuel supply member extends between an outer edge and a center region of the first permeable layer and allows distribution of the fuel in a radial fashion. Further, the fuel supply member is connected to an external fuel manifold adjacent the outer edge. The oxidant gas supply member supplies oxidant gas into the second permeable layer. The oxidant gas supply member extends between an outer edge and a center region of the second permeable layer and allows distribution of the oxidant gas in a radial fashion. The oxidant gas supply member is connected to an external oxidant gas manifold adjacent the outer edge.

38 Claims, 6 Drawing Sheets

SEALLESS RADIAL SOLID OXIDE FUEL CELL STACK DESIGN

BACKGROUND OF THE INVENTION

The present invention generally relates to fuel cell fabrication techniques and, more particularly, to fabrication of solid electrolyte planar fuel cells.

A fuel cell is basically a galvanic conversion device that electrochemically reacts a fuel with an oxidant to generate a direct current. A fuel cell typically includes a cathode material, an electrolyte material, and an anode material. The electrolyte is a non-porous material sandwiched between the cathode and anode materials. An individual electrochemical cell usually generates a relatively small voltage. Thus, to achieve higher voltages that are practically useful, the individual electrochemical cells are connected together in series to form a stack. Electrical connection between cells is achieved by the use of an electrical interconnect between the cathode and anode of adjacent cells. The electrical interconnect also provides for passageways which allow oxidant fluid to flow past the cathode and fuel fluid to flow past the anode, while keeping these fluids separated. Also typically included in the stack are ducts or manifolding to conduct the fuel and oxidant into and out of the stack.

The fuel and oxidant fluids are typically gases and are continuously passed through separate passageways. Electrochemical conversion occurs at or near the three-phase boundaries of each electrode (cathode and anode) and the electrolyte. The fuel is electrochemically reacted with the oxidant to produce a DC electrical output. The anode or fuel electrode enhances the rate at which electrochemical reactions occur on the fuel side. The cathode or oxidant electrode functions similarly on the oxidant side.

Fuel cells with solid electrolytes are the most promising technologies for power generation. Solid electrolytes are either ion conducting ceramic or polymer membranes. In the former instance, the electrolyte is typically made of a ceramic, such as dense yttria-stabilized zirconia (YSZ) ceramic, that is a nonconductor of electrons, which ensures that the electrons must pass through the external circuit to do useful work. With such an electrolyte, the anode is oftentimes made of nickel/YSZ cermet and the cathode is oftentimes made of doped lanthanum manganite.

Perhaps the most advanced construction with ceramic membranes is the tubular solid oxide fuel cell based on cubic zirconia electrolyte. The tubular construction can be assembled into relatively large units without seals and this is its biggest engineering advantage. However, tubular solid oxide fuel cells are fabricated by electrochemical vapor deposition processes, which are slow and costly. The tubular geometry of these fuel cells also limits the specific power density, both on weight and volume bases, to low values. The electron conduction paths are also long and lead to high energy losses due to internal resistance heating. For these reasons, other constructions based on planar cells are actively being pursued.

One alternative of the planar stack construction resembles a cross-flow heat exchanger in a cubic configuration. The planar cross flow fuel cell is built from alternating flat single cell membranes (which are tri-layer anode/electrolyte/cathode structures) and bipolar plates (which conduct current from cell to cell and provide channels for gas flow into a cubic structure or stack). The bipolar plates are oftentimes made of suitable metallic materials. The cross-flow stack is manifolded externally on four faces for fuel and oxidant gas management.

The cross-flow or cubic design, however, requires extensive sealing, both in terms of the number of seal interfaces and the linear size of such interfaces. The latter increases with the stack footprint and leads to serious problems if the metal and ceramic cell parts do not have closely matched thermal expansion coefficients. A significant mismatch in the thermal expansion coefficients leads to thermal stresses that can cause catastrophic failure on cool down from the stack operating temperature.

An alternative to the planar cross-flow or cubic design is the planar radial flow design. For example, U.S. Pat. No. 4,770,955 discloses an annular shaped anode, cathode, and electrolyte sandwiched therebetween. Annular shaped separator plates sandwich the combination of anode, cathode, and electrolyte. The above components each describe two holes and, consequently, two tubes. One tube provides a fuel flow while the other tube provides an oxidant flow. The cathode is protected from direct fuel contact in one tube by a tubular gasket that forms a seal with one separator and electrolyte. The anode is protected from direct oxidant contact in the other tube by another tubular gasket that forms a seal with the other separator and electrolyte. Yet, the design appears to inherently lack good flow control because it is based on the porosity of the electrode and radial length of the porous electrode from the tube. Also, the non-symmetrical position of the tubes results in differing flow path lengths as a function of the central angle with the tube as the center and, thus, non-uniform flow distribution. U.S. Pat. No. 5,589,285 is similar to the foregoing.

In another example of a radial fuel stack design, U.S. Pat. No. 4,490,445 provides alternating circular cells and conductor plates. The cells and plates are provided with holes along their peripheries to create fuel and oxidant inlets and outlets. The conductor plates are provided with circumferential ridges along the edges to provide seals with the cells. The conductor plates also have grooves on opposing faces that provide flow both radially and circumferentially, although primarily the latter. With the potential flow paths being somewhat random, non-uniform flow distribution can be expected.

U.S. Pat. No. 4,910,100 discloses various embodiments of a radial fuel cell stack design that include fuel and oxidant channels in the central area of the stack. Gas holes in the fuel and oxidant channels supply flows across the opposing faces of annular shaped separator plates that are alternately disposed with annular shaped single cells. Guide vanes on the opposing faces of the separator plates direct fuel and oxidant flow from a central area of the stack and towards the peripheral area. It is claimed that the plates and cells may be stacked without gas seals. However, some of the disadvantages to this design include the non-uniform distribution of oxidant and fuel gases due to the use of two internal manifold tubes and the heavy, all-ceramic construction of individual parts.

More recently, in U.S. Pat. No. 5,549,983, a co-flow planar fuel cell stack for solid electrolytes includes an internal manifold having fuel and oxidant cavities. Tubular porous elements surround the manifold for controlling radial fuel and oxidant flows. The tubular porous elements may also be called flow distributor elements or simply flow distributors. Annular, planar cells of anode/electrolyte/cathode are disposed about the porous elements. An annular separator plate is sandwiched between each single cell and each current conductor element. The single cells and separator plates extend at their inner diameters to the inner manifold. Accordingly, a sealant is required to seal the separator plates and single cells to the manifold and porous elements.

Internally manifolded radial stack designs require substantially less glass based sealing than the cross-flow design, especially if the required gas streams are introduced into the stack via a central, dual cavity manifold. Advanced radial stack designs have reduced the number of required glass seals to two per cell and one per separator plate, but two of these seals have to be made during stack assembly, are blind seals, and their integrity cannot be inspected and repaired.

The physical integrity and mechanical reliability of sealing cross-flow or radial stacks with glass based sealants is not adequate at the present time. Moreover, the glass-based sealants are silicate glasses, which contain alkali and alkaline earth ions in their composition. Such glasses are electrolytes in a viscous state at the operating temperatures of zirconia-based solid oxide fuel cells. In fact, such glass-based sealants have the propensity to attack the metal interconnect and the cells of the stack and lead to degradation of the stack performance and thus severely limiting the stack lifetime. In other words, glass based sealants which are necessary in current stack designs have undesirable effects on stack performance and are undesirable.

As can be seen, there is a need for an improved fuel cell stack design. In particular, there is a need for a radial flow fuel cell stack that eliminates the required sealing and the requirement of using sealant materials to separate the fuel and oxidant gas streams. Also needed is a fuel cell stack that provides a more uniform flow field and, thereby, more uniform current density and temperature distributions.

SUMMARY OF THE INVENTION

The present invention provides a novel fuel cell stack design for fuel cells that are based on planar, solid electrolytes. Fuel cells with known planar, solid electrolytes are the polymer electrolyte membrane (PEM) and the solid oxide fuel cells. In particular, the present invention provides a fuel cell stack design that is axisymmetric, the reactant gas streams flow in a radial direction, and eliminates the need for sealants to separate the gaseous reactant streams.

In one aspect of the present invention, a fuel cell stack system comprises a first permeable or interconnect layer, a second permeable or interconnect layer, a continuous cell, a fuel supply member and an oxidant gas supply member. The continuous cell is disposed between the first and second interconnect layers and separates the fuel and oxidant gas streams without the use of sealants. The fuel supply member is for supplying fuel into the first interconnect layer that is in contact with the anode electrode of the continuous cell and extends between an outer edge and an inner cavity of the first interconnect layer. The fuel supply member is connected to an external fuel manifold adjacent the outer edge of the first interconnect layer. Further, the oxidant gas supply member is for supplying oxidant gas into the second interconnect layer that is in contact with the cathode electrode of the continuous cell and extends between an outer edge and an inner cavity of the second interconnect layer. The oxidant gas supply member is connected to an external oxidant gas manifold adjacent the outer edge.

In another aspect of the present invention, a process for forming a fuel cell stack comprises the steps of providing a first interconnect or permeable layer having an inner cavity, disposing a continuous cell on the first interconnect layer, disposing a second interconnect or permeable layer having an inner cavity on the continuous cell, connecting the inner cavity of the first interconnect layer to a fuel manifold located external to the fuel cell, and connecting the inner cavity of the second interconnect layer to an oxidant gas manifold located external to the fuel cell.

These and other features, aspects and advantages of the present invention will become better understood with reference to the following drawings, description and claims.

DETAILED DESCRIPTION OF THE INVENTION

Figure 1:
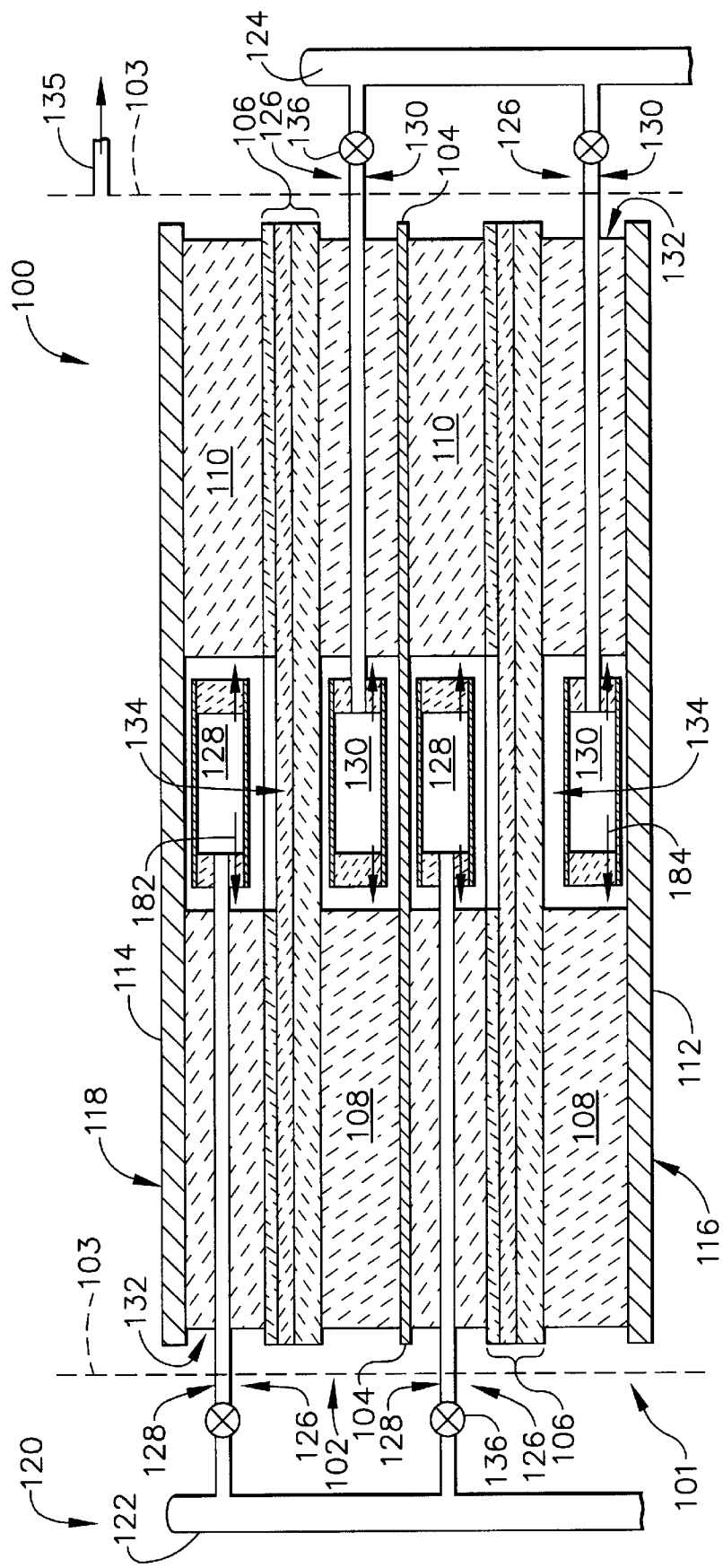
FIG. 1 is a schematic cross-sectional view of a sealless fuel cell stack system of the present invention having two cells.

The present invention provides a novel fuel cell stack design for fuel cells that are based on planar, solid electrolytes. Fuel cells with known planar, solid electrolytes are the polymer electrolyte membrane (PEM) and the solid oxide fuel cells. In particular, the present invention provides a fuel cell stack design that is axisymmetric, the reactant gas streams flow in a radial direction, and eliminates the need for sealants to separate the gaseous reactant streams. The term "sealless stack" design is hereby used to indicate the absence of sealants in the stack structure for reactant gas separation.

The axisymmetric feature of the stack design of the present invention is a result of the round footprint used for the continuous cell, the continuous separator plates, the interconnects that are used for the fabrication of the stack, as well as the introduction of the reactant gas streams at or near the center of the continuous cell and the radial flow of the gas streams to the edge of the continuous cell where they exit the stack structure. The round footprint in the continuous cells and continuous separator plates, as well as the radial flow of the reactant gases, lead to axial symmetry in the current and temperature distributions in the stack and moderation of potential thermal stresses. The attribute term "continuous" is hereby defined to mean the absence of openings and through-the-thickness porosity.

Like in all fuel cells, the reactant gas streams are two, a fuel gas stream that flows past the anode electrode and an oxidant gas stream that flows past the cathode electrode. For solid oxide fuel cells, the fuel gas stream may be pure hydrogen, a mixture of hydrogen and carbon monoxide, a mixture of hydrogen and carbon monoxide with inert diluents, a mixture of hydrogen and carbon monoxide with light hydrocarbons and inert diluents, or a mixture of hydrogen and carbon monoxide with light hydrocarbons, light alcohols and inert diluents. The oxidant gas stream may be air, air enriched with oxygen, or pure oxygen.

Reference will now be made to the drawings wherein like numerals refer to like parts throughout. The fuel cell stack system of the present invention provides a novel radial flow fuel cell stack employing an external manifold system in conjunction with continuous electrode or cell, continuous separator, and current collector layers. The combined use of the external manifold system and the continuous layers eliminates the use of glass-based sealants. The prior art generally uses glass-based sealants to seal their internal manifold structure. In such prior art systems, glass-based sealants react with various cell components and cause cell degradation due to active ions in the sealant compositions at operating temperatures. However, as opposed to prior art systems with internal manifolds, the fuel cell system of the present invention advantageously employs a radial distribution system that is connected to the external manifold system located around the fuel cell stack, thereby eliminating seals that would otherwise be needed.

FIG. 1 shows a fuel cell stack system 100 comprising first and second fuel cell subsystems 101 and 102. The second fuel cell subsystem 102 is stacked over the first fuel cell subsystem 101. While the fuel cell stack 100 and its components are described in a preferred embodiment as being circular in overall configuration, the present invention contemplates that other configurations, such as polygonal, are within the scope of this invention and can be utilized. The fuel cell stack 100 is generally applicable for the use of solid electrolytes. Accordingly, the present invention contemplates that the fuel cell stack 100 can be used in the context of at least solid oxide fuel cells and proton exchange membrane fuel cells, which both are well known in the art.

In this embodiment, and in terms of its structural properties and design characteristics, the first fuel cell subsystem 101 is a copy of the second fuel cell subsystem 102. For the purpose of clarity, in this embodiment, the stack 100 has only two cell subsystems and may be contained in a housing 103. However, it is within the scope of this invention that a plurality of fuel cell subsystems can be stacked vertically to form an array of fuel cell stack systems that are serially connected. For stacks with more than two cells, the cells are placed in a stack sequence having an ABABAB pattern (with A being a cell, e.g., 198 in FIG. 3, and B being an interconnect assembly, e.g., 196 in FIG. 3, and so on). However, the cells in a stack may be connected in parallel with other cells in other stacks by utilizing an external wiring system or some other means known in the art.

The first fuel cell subsystem 101 is physically separated from the second fuel cell subsystem 102 by a continuous separator plate 104. The continuous separator plate 104 is a continuous layer separating the first fuel cell subsystem 101 from the second fuel cell subsystem 102, thereby separating fuel and oxidant gas flows. In the context of this application, the word "continuous" refers to a layer structure having no through-the-thickness openings or holes in its entire body.

Each of the cell subsystems 101, 102 comprises a continuous cell 106 that is interposed between first and second interconnect or permeable layers 108 and 110. In accordance with the principles of the present invention, the cell 106 has a continuous structure. The first and second interconnect layers 108 and 110 are made of a fluid permeable material allowing the fuel and oxidant gas to propagate through channels in the interconnect layers 108 and 110. In a preferred embodiment, the first and second interconnects are highly porous so as to present very little resistance to gas flow. Bottom and top end plates 112 and 114 are of a continuous structure and form a bottom 116 and a top 118 of the stack 100. The bottom and top end plates 112, 114 function as current collectors in the system 100 and collect the current generated by the system 100. Therefore, the end plates 112 and 114 are also connected to an external load through an external wiring network (not shown). The end or current collector plates 112, 114 and continuous separator plate 104 are constructed and serve functions according to those well known in the art. In particular, they are designed so as to satisfy at least the minimum requirements for carrying the current load. Due to the preferred cylindrical shape of the fuel cell stack system 100, all of the layered components, such as the continuous separator plate 104, cell 106, interconnect layers 108 and 110, current collector layers 112 and 114 comprise a circular shape.

Referring back to FIG. 1, an oxidant gas manifold 122 and a fuel manifold 124 (external manifolds 120) of the stack 100 are connected to a supply subsystem 126 of the stack 100. The supply subsystem 126 may be comprised of an oxidant gas supply member 128 and a fuel supply member 130. In this respect, the oxidant gas manifold 122 is connected to an oxidant gas supply member 128, and the fuel manifold 124 is connected to a fuel supply member 130. As will be described more fully below, the oxidant gas and fuel supply members 128 and 130 extend, through suitable passageways or channels in the interconnects 108 and 110, from an outer edge 132 of the stack 100 to a central section 134 of the stack 100. As such, once the fuel and oxidant gases are brought to the central section 134, they uniformly permeate or flow through the interconnects 108 and 110. The spend oxidant gas and fuel are taken out through an outlet port 135 of the housing 103. For the sake of simplicity, FIG. 1 shows the oxidant gas and the fuel supply members 128 and 130 spaced 180° apart, but any other possible annular separation would be satisfactory.

The external oxidant gas manifold 122 and fuel manifold 124 are also connected to a fuel source and an oxidant gas source (not shown). The external manifolds 122 and 124 may also comprise closure members 136, for example valves, attached between the external manifolds and the supply members 128 and 130. The valves 136 may be used to turn on or turn off the oxidant gas or fuel flow into the cell subsystems 101 and 102. Since each cell subsystem 101, 102 has its own oxidant gas and fuel supply members 128 and 130, oxidant gas or fuel flow to a malfunctioning cell subsystem may be cut off using valves 136. For example, with the aforementioned stack sequence and external wiring amongst the stack systems, the fuel flow to a cell subsystem 101, 102 may be cut-off and then the cut-off cell subsystem may be jump wired to another cell subsystem in same or different stack through an appropriate external wiring system (not shown). This ability, in turn, provides the opportunity to service and save the stack systems in case one or more cell subsystems malfunction. In the case where valves 136 are not present, the tubing of the supply member can be crimped to cut off fuel or oxidant gas supply to a cell subsystem.

The external manifolds 122 and 124 may be made of metallic alloys, intermetallics, ceramics and metal ceramics composites and other suitable materials. As described more fully below, in the fuel stack system 100 of the present invention, the use of glass sealants can be entirely eliminated using the external manifolds 122 and 124 and supply members 128 and 130; in conjunction with the continuous cell 106; end plates 112, 114; and continuous separator plate 104. As previously mentioned, the prior art for radial flow stack systems use internal manifolds and components with annular openings, which require the substantial use of glass sealants to seal components together and to separate the reactant gas streams from one another. These prior art components having annular openings may generally be cells, separators, end plates, and separator plates.

Figure 2A:
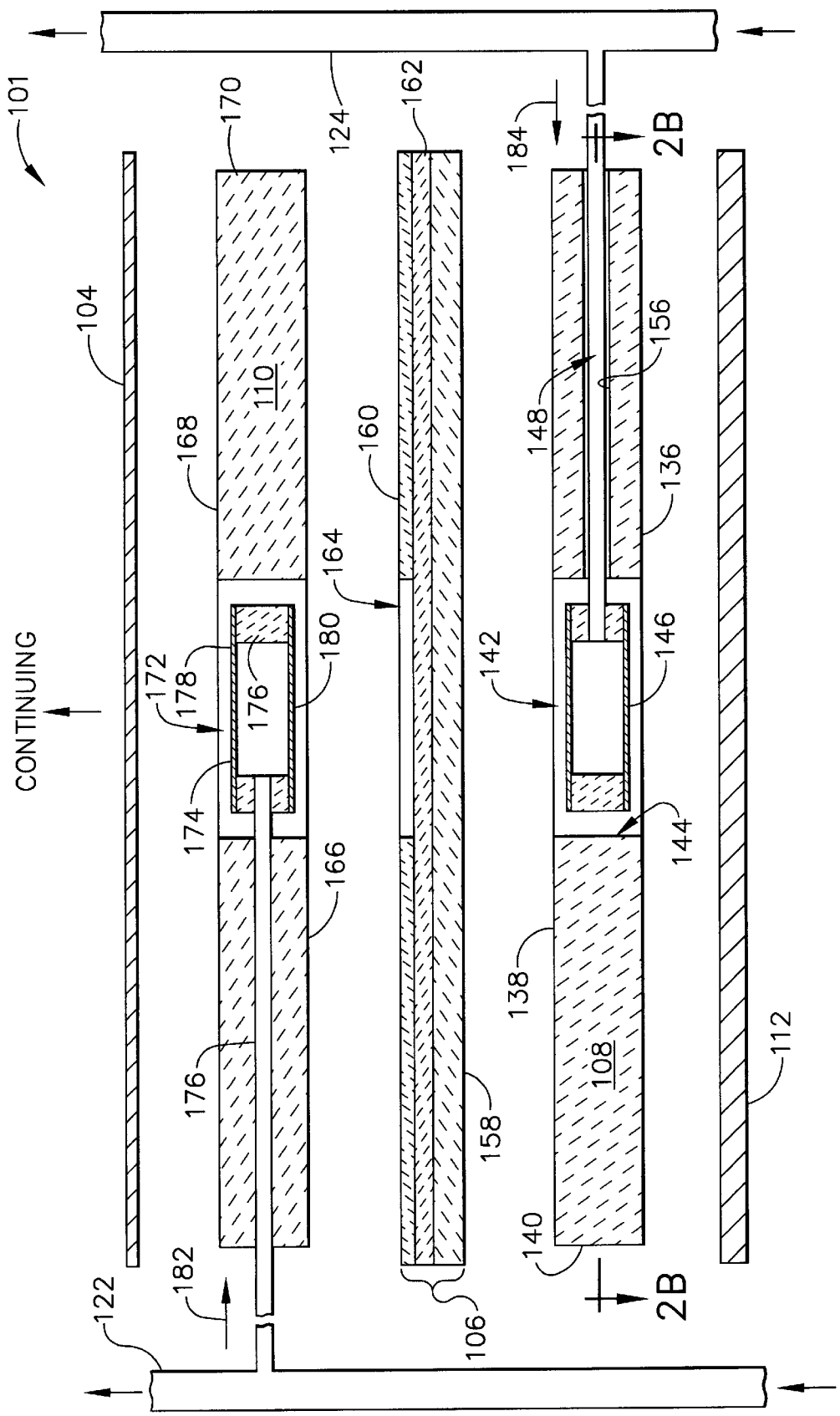
FIG. 2A is a schematic view of a one-cell subsystem of a sealless fuel cell stack system of the present invention.

FIG. 2A shows a detailed illustration of the fuel cell subsystem 101 in a partial exploded view. Since both cell subsystems 101 and 102 have the same repeating structure, and for the purpose of clarity, a more detailed description of the cell subsystems will be given using one of the cell subsystems, such as the first fuel cell subsystem 101. Referring to FIG. 2A, the end plate 112 forms the first component of the fuel stack system 100 and the cell subsystem 101. The end plate 112 is preferably a continuous, metallic plate having a circular shape. In addition, the end plate 112 is adapted to withstand all the forces of the operation conditions, such as heat, weight of the stack 100, and varying current characteristics and they usually have a thicker cross section than a continuous separator plate 104. Both end plates 112 and 114 (FIG. 1) serve to collect current generated by the cells 106 and can be constructed of electrically conducting materials such as metals, oxidation resistant alloys, stainless steel, intermetallics, ceramics, metal ceramics composites or superalloys.

Figure 2B:
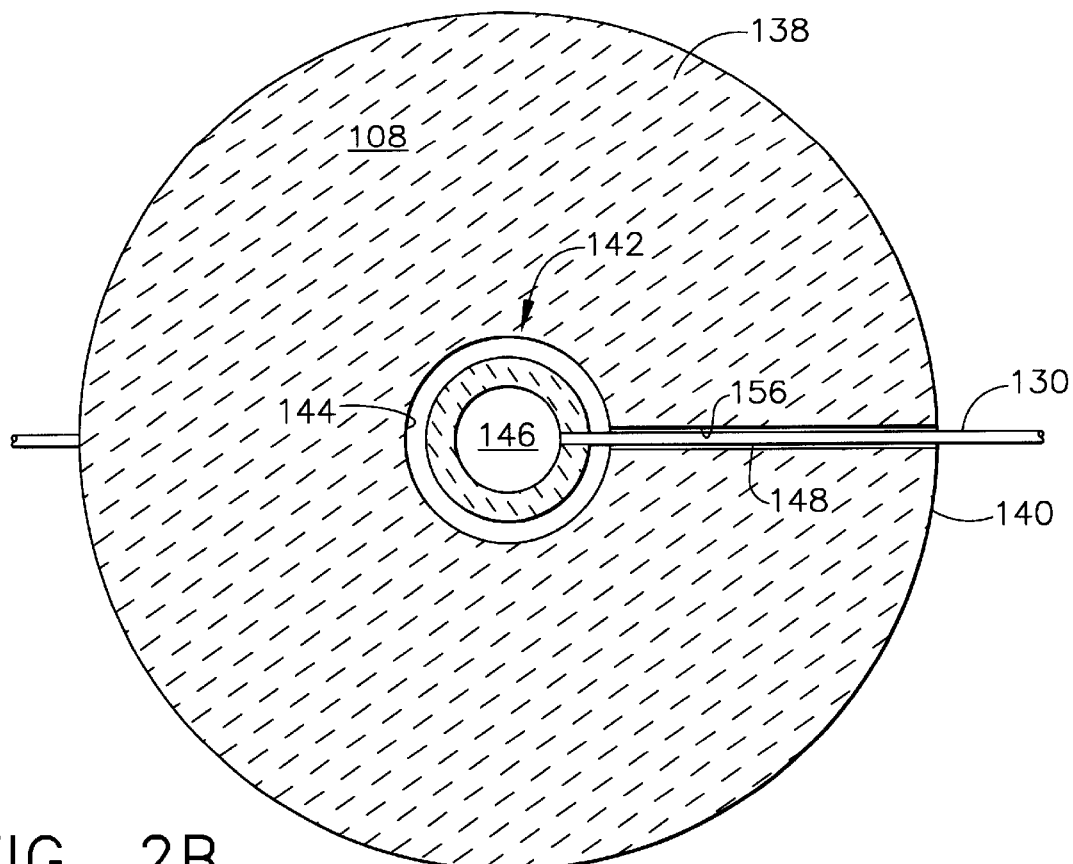
FIG. 2B is a schematic, partial plan view of the one-cell subsystem shown in FIG. 2A wherein a supply member has been included in the one-cell subsystem.

Referring to FIGS. 2A and 2B, in the preferred embodiment, the first interconnect or current conductor element 108 may be placed over the end plate 112. In this embodiment, the first interconnect 108 is sandwiched between the end plate 112 and the anode layer 158 of the cell 106, thereby forming the anode interconnect side of the first cell subsystem 101. The first interconnect 108 is an annular plate which is defined by lower and upper surfaces 136 and 138, a peripheral edge 140, and an circular opening 142 or an inner cavity communicating the lower and the upper surfaces 136 and 138. In this embodiment, the lower and the upper surfaces 136 and 138 are substantially parallel to each other. The peripheral edge 140 is perpendicular to the upper surfaces 136 and 138. The circular opening 142 is an open cylindrical opening having a side wall 144. Sidewalls 140 and 144 are as permeable as the interconnect 108. Although it may not be necessary, the first interconnect or permeable layer 108 may be fixed to its immediately adjacent components of end plates or continuous separator plates by such means as brazing or bonding. The peripheral edge 140 of the first interconnect 108 extends substantially to the outer periphery of the end plate 112. In this embodiment, the first interconnect layer 108 may be configured as an annular plate having a plurality of open channels to allow fuel flow therein.

The first interconnect layer 108 is made of an electronic conductor material such as metal or other electrically conductive materials. The first interconnect 108 preferably has a skeletal structure so as to allow unimpeded flow of oxidant gas and fuel, as described hereinafter. The material comprising the first interconnect 108 should be distributed uniformly in all directions in the space between each cell and continuous separator plate (or end plate) so as to facilitate the radial flow of fuel. The interconnect 108 is preferably made of metal foils, i.e., thin metal sheets, so as to lead to lightweight stacks. Yet, these components need to have sufficient thickness to provide sufficient current conduction capacity and the desired lifetime for the stack 100. The metal foils can be formed into a variety of geometrical shapes that provide for uniform fluid flow in the radial direction and sufficient electrical current conduction capacity in the longitudinal direction. One preferred example of an interconnect 108 structure is thin metal foils formed into off-set fin shapes and sliced and arranged so as to facilitate the radial flow direction of the fuel gases. The interconnect 108 is made of an electrically conductive material. Suitable materials for the interconnect 108 includes metallic alloys, intermetallics, metalceramic composites, and electron conducting ceramics.

Figure 2C:
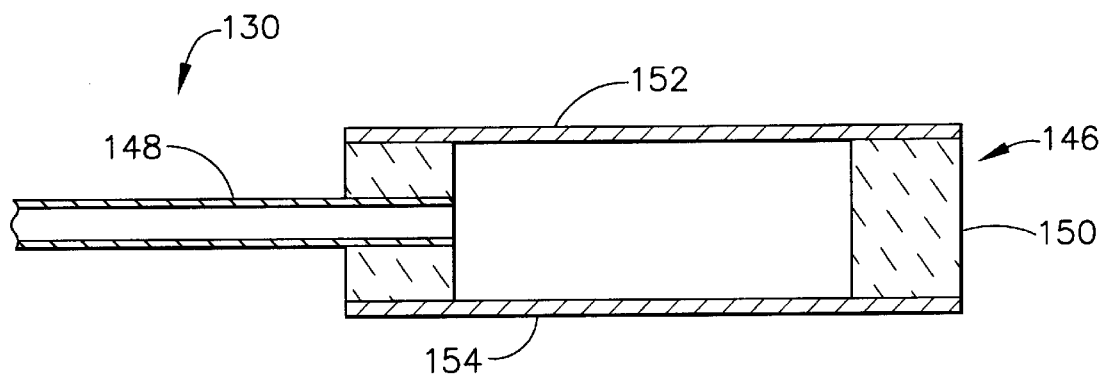
FIG. 2C is a schematic side view of the supply member shown in FIG. 2B.

As shown in FIGS. 2A to 2C, the fuel supply member 130 extends between the peripheral edge 140 and the essentially circular opening 142. The circular opening 142 will also be referred to as inner cavity of interconnect 108. The fuel supply member 130 may comprise a flow distributor section 146 and a tube section 148. In this embodiment, the flow distribution section 146 is placed into the circular opening 142, and the tube section 148 connects the flow distribution section 146 to the fuel manifold 124. Referring to FIGS. 2B and 2C, the distribution section 146 may preferably comprise a cylindrical body having a porous side wall 150 enclosed with a top surface 152 and a bottom surface 154. In the preferred embodiment, the flow distribution section 146 may comprise a porous material allowing uniform and radial distribution of fuel into the interconnect 108 with essentially 360 degree distribution uniformity. The porous material of the distribution section 146 may comprise a porous metal or ceramic. The top and bottom surfaces 152 and 154 may be made of metal foils. The flow tube 148 may be connected to the flow distribution section 146 using brazing or bonding techniques known in the art. The tube 148 may be made of a metallic material or ceramics. The flow distribution section 146 may also be made as a single or multiple orifices or as a porous material that acts like a gas diffuser and moderates the linear flow velocity of the emerging gas stream.

In one design option, the tube 148 is made of a metallic material and in this case the tube may have an integral ceramic insulator that is made of a perforated ceramic plate or short ceramic tubing or, preferably, the tube 148 may be outfitted with a ceramic sleeve to electrically isolate it from the electron-conducting interconnects and continuous separator or end plates. Referring to FIGS. 2A and 2B, and in one embodiment, the flow tube 148 may be fitted into a passageway 156 formed in the interconnect 108, extending between the circular opening 142 and the peripheral edge 140. The passageway 156 may be positioned between the surfaces 136 and 138 and of the interconnect 108, and may run parallel to the surfaces 136 and 138. The passageway may also be in the form of a channel transversing the length and thickness of interconnect 108. However, it is within the scope of this invention that the flow tube 148 may be formed as an integral part of the interconnect assembly 196 (FIG. 3) and the distribution section 146 may be made without the top 152 or the bottom 154 surfaces.

After the placement of the first interconnect 108 and the fuel supply member 130, the continuous cell 106 is placed over the first interconnect 108. The cell 106 comprises an anode layer 158, a cathode layer 160, and a solid electrolyte layer 162 interposed between the anode 158 and the cathode 160. The cathode plate 160 may have a circular opening exposing underlying solid electrolyte 162 to oxidizing gas distributed into the second interconnect 110. Tri-layer construction of anode-electrolyte-cathode is well known in the art. The anode layer 158 can be made of nickel/YSZ cermet; the electrolyte layer 162 can be made of yttria-stabilized zirconia (YSZ); and the cathode layer 160 can be made of strontium-doped lanthanum manganite. Although it may not be necessary, the cell 106 may be fixed on the first interconnect 108 and the second interconnect 110 by means of brazing or bonding. Materials that may be used to bond the cell to the interconnects include ceramics and inorganic materials that may or may not undergo a phase change during stack operation as well as base or noble metals.

The second interconnect 110 is placed on the cathode side of the cell 106. The oxidizing gas is supplied and distributed through the oxidant gas supply member 128. The second interconnect 110 is defined by a bottom and upper surfaces 166 and 168, and a peripheral edge 170. A circular opening 172 of the second interconnect 110 extends between the bottom and upper surfaces 166 and 168. The oxidant gas supply member 128 is connected to the oxidant gas manifold 122. The oxidant gas supply member 128 extends between the peripheral edge 170 and the circular opening 172. The oxidant gas supply member 128 may comprise a flow distributor section 174 and a tube section 176. In this embodiment the flow distribution section 174 is placed into the circular opening 172, and the tube section 176 connects the flow distribution section 172 to the oxidant gas manifold 122. In the preferred embodiment, the flow distribution section 174 may comprise a porous material allowing uniform and radial distribution of the oxidant gas into the interconnect 110 with a full 360 degree distribution efficiency. A porous side wall 176 of the distribution section 174 may comprise a porous metal or ceramic. Top and bottom surfaces 178 and 180 may be made of metal foils. It is understood that the structural details of the second interconnect 110 and the oxidant gas supply member 128 are the same as the structural details of the first interconnect 108 and the fuel supply member 130. Therefore, their structural details will not be repeated.

The continuous separator plate 104 is disposed over the second interconnect 110 and is planar in configuration. The continuous separator plate 104 serves to separate the flows of oxidant and fuel in the stack between the cell subsystems 101 and the 102 as they pass through the interconnects. The continuous separator plate 104 must be made of an electronic conductor material to also carry the current generated from one single cell to the next. Thus, the continuous separator plate 104 may be made from metallic alloys, intermetallics, metal-ceramic composites, and electronic conducting ceramics.

Figure 3:
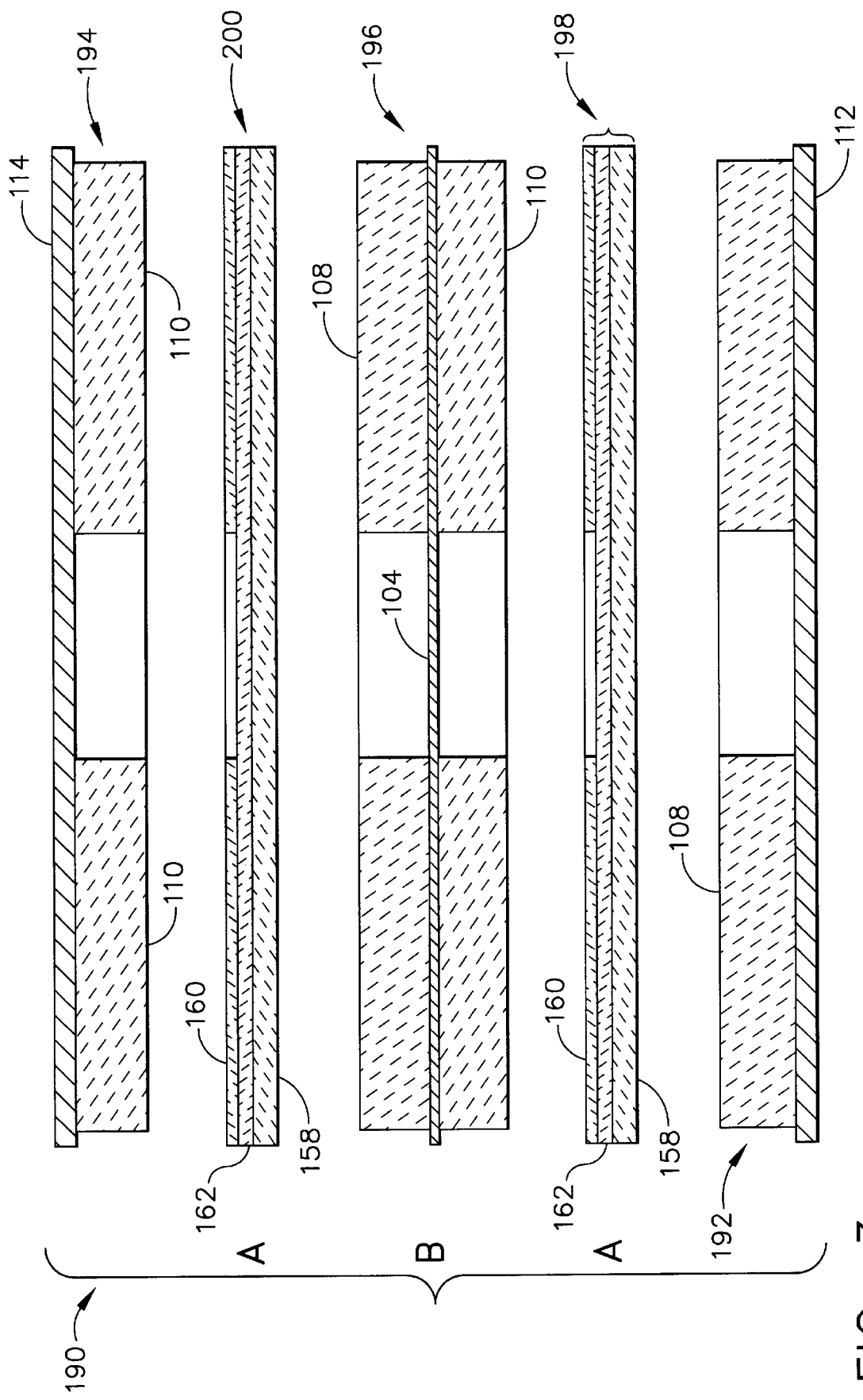
FIG. 3 is a schematic, partial exploded view of an embodiment of the sealless fuel cell stack system of the present invention having two cells.

In one embodiment, and because the stack system 100 of the present embodiment does not need any sealant, the stack system 100 may be constructed using partially integrated system components. FIG. 3 shows a stack assembly 190 of the system 100 that comprises bottom and top interconnect end plates 192 and 194, an interconnect assembly 196, and two cells 198 and 200. The bottom interconnect end plate 192 comprises an assembly of the first interconnect 108 and the end plate 112 of the system 100 (FIGS. 1 to 2C). Here, the interconnect 108 is fixed on the end plate 112. Similarly, the top interconnect end plate 194 comprises an assembly of the second interconnect 110 and the end plate 114 of the system 100 (FIGS. 1 to 2C). The end plate 114 is fixed on top of the interconnect 110. The cells 198 and 200 both comprise the anode 158, the cathode 160, and the solid electrolyte 162 (FIGS. 1 to 2C). The interconnect assembly 196 comprises an assembly of the continuous separator plate 104 sandwiched between the first interconnect 108 and the second interconnect 110. These system components 192, 194, 196, 198 and 200 of the assembly 190 can be assembled, as in the manner described above and as in the manner shown in FIGS. 1 to 3, to form the fuel stack system 100 of the present invention.

For better control of the electrochemical performance of the stack, it may be advantageous to install a so-called gas barrier ring at the periphery of the interconnect 108 on the anode side of the cell 106 and the periphery of the interconnect 110 on the cathode side of the cell 106. The gas barrier ring impedes backflow of gases into the interconnect 108 or 110 spaces. In particular, a gas barrier ring at the periphery of interconnect 108 would impede backflow or diffusional flow of oxidant gas into the interconnect space, which would locally change the concentration of the fuel and affect the electrochemical performance of the stack. The barrier ring may be made of ceramic, metallic, ceramic-metallic composites, or ceramic fiber.

During operation of the fuel cell stack system 100, the oxidant gas is flowed into the oxidant gas flow distributor section 174 (in the direction of arrow 182) of the oxidant gas supply member 128, while fuel is flowed into the fuel flow distributor section 146 (in the direction of arrow 184) of the fuel supply member 130. The oxidant flows out of the section 174 through the porous openings, and into the second interconnect 110. The oxidant then moves through the second interconnect 110 uniform and across the cathode 160 of the cell 101 in a substantially radial flow. Likewise, the fuel flows out of the section 146 through the porous openings, and into the first interconnect 108. The fuel, in the meantime, moves through the first interconnects 108 and across the anode 158 of the cell subsystem 101 also in a substantially uniform radial flow.

At start up, the stack system 100 is heated to the operation temperature or a bonding temperature, if needed, by suitable means. For example, for laboratory testing the heating of the stack is done in an electrically heated furnace in still air. In a real stack operation, combustion gases could be used to heat up the stack. After the stack 100 reaches its operating temperature, the fuel flow is ramped so as to achieve the reduction of the nickel oxide phase of the anode 158 to nickel in a gradual manner, so as to avoid catastrophic stresses that may arise from the volume change that accompanies the reduction. After completion of the anode reduction, electrochemical reactions across the cell subsystem 101 produce a current so long as fuel is flown past the anode electrode 158 of cell 106, oxidant gas is flown past the cathode electrode 160 of cell 106, and a resistive load is placed across the stack system 100. Spent fuel and oxidant gases are exhausted out of the fuel stack system 100 and through the outlet port 135 (see FIG. 1).

EXAMPLE

It will be understood that this invention is susceptible to modification in order to adapt it to different uses and conditions. The following example is given for illustrative purposes only and is not intended to impose limitations on the subject invention.

Stack Fabrication and Assembly

Referring to FIGS. 1 and 3, a complete, sealless radial stack 190 comprising two cell subsystems designed according to the present invention was fabricated in several steps. The first step involved fabrication of the top metallic interconnect end plate 194, the bottom interconnect end plate 192 and one interconnect assembly 196 by brazing. Each interconnect end plate 192 or 194 comprises either interconnect 108 or 110 and an end plate 112 or 114. As previously mentioned, the interconnects 108 and 110 were made of metal foil formed into an off-set fin structure and cut into segments having a circular sector geometry.

Referring to FIG. 2C, the second step involved fabrication of the oxidant gas supply assemblies 146. For this particular example, a hollow ceramic insulator was spliced into the tubing 148 of the oxidant gas supply assembly 146 by brazing. Referring to FIG. 3, the third step involved metallization of the cell electrodes 158 and 160 by painting the exterior surface of the electrodes with a noble metal metallo-organic ink and firing the cell in an air furnace to about 900° C. The cell 198 or 200 had previously been formed from a ceramic bilayer comprising a layer of yttria-stabilized zirconia (the electrolyte layer 162), and a second layer of yttria-stabilized zirconia mixed with nickel oxide (the anode layer 158), by depositing and firing a strontium-doped lanthanum manganite layer (the cathode layer 160) onto the electrolyte layer 162. The ceramic bilayer was formed in the green state by calendering anode and electrolyte layer tapes together. The electrolyte layer 162 in this fired ceramic bilayer had a thickness of about 5 to 10 micrometers.

Referring to FIG. 2B and 3, the fourth step involved insertion of each oxidant gas or fuel supply member or assembly 146 into a suitable radial channel in each interconnect 108 and 110 with interconnect end plate 192 and 194 or assembly 196. The fifth step involved painting the top surfaces of the interconnects 108 and 110 and the cell electrodes with a suitable bonding material. Referring to FIG. 3, the sixth step involved assembly of the stack 100. The bottom interconnect end plate 192 was placed onto an alumina plate resting on a stand made of a nickel superalloy. The first cell 198 was then positioned onto the bottom interconnect end plate, the cell's anode layer 158 facing down. Next, the interconnect assembly 196 was placed onto the first cell 198. Then the second cell 200 was placed on top of the interconnect assembly 196, this being followed by placement of the top interconnect end plate 194 onto the second cell 200. Finally, a barrier ring was placed around the periphery of each cell on the anode side.

Stack Installation and Firing

The assembled stack 100 (FIG. 1) was placed in an electrically heated furnace at ambient temperature. The oxidant gas supply assemblies or members 128 on the cathode side of each cell were connected to an air supply source through the manifold 122, such as oxidant gas cylinders or filtered house air, by means of nickel superalloy tubing and Swagelok™ fittings. The fuel supply assemblies or members 130 on the anode side of each cell were connected to a hydrogen supply source through the manifold 124, such as hydrogen gas cylinders, by means of nickel superalloy tubing and Swagelok™ fittings. A bundle of platinum wires were spot-welded to two-diametrically opposed spots at the periphery of the bottom end plate 112, the negative stack pole, of the stack and to one end of welding copper cable outside the furnace. A similar electric connection was made for the top end plate 114, the positive stack pole, of the stack. During stack testing, the other ends of the welding copper cables were connected to the negative and positive terminals of an electronic load, respectively.

Referring to FIG. 3, single platinum wires were also spot-welded to the periphery of the interconnect end plates 192 and 194 as well as the continuous separator plate 104 of the interconnect assembly 196 for monitoring the voltage across the cells and the stack during operation and testing. A set of four thermocouples having ungrounded junctions and Inconel sheaths were placed into the void space of the interconnect 110 on the cathode side of the first cell in a radial direction, approximately one inch from the periphery of the interconnect end plates 112 and 114 and assembly 196, and at approximately 60 degree apart. A set of two thermocouples were similarly placed into the void space of the interconnect 110 on the cathode side of the second cell but spaced 180 degree apart.

The stack system 100 was tested for electrical shorting after all the aforementioned connections were made and none was found. In the absence of electrical shorting, the furnace was closed and the temperature of the furnace and, therefore, the stack, was ramped to the desired level for bonding of the interconnects to the cell electrodes. Subsequently, the furnace temperature was brought to the stack operating temperature as desired.

Anode Reduction and Stack Testing

After the stack 100 was brought to the desired operating temperature, helium gas was fed to the anode side and air flow was established on the cathode side. Hydrogen gas, the fuel, was programmed to replace the helium gas on the anode side linearly over a period of 3 hours. The introduction of hydrogen into the helium gas stream reduces the dispersed nickel oxide component of the anode to nickel metal. The reduction of the nickel oxide to nickel is accompanied by the development of voltage across the cell. At the completion of reduction and at 800° C., the open circuit voltage (OCV) of this two-cell radial stack, Stack 100, was 2.109 V at hydrogen and air flow rates of 1 and 2.4 standard liters per minute (slpm) per cell, respectively.

Figure 4:
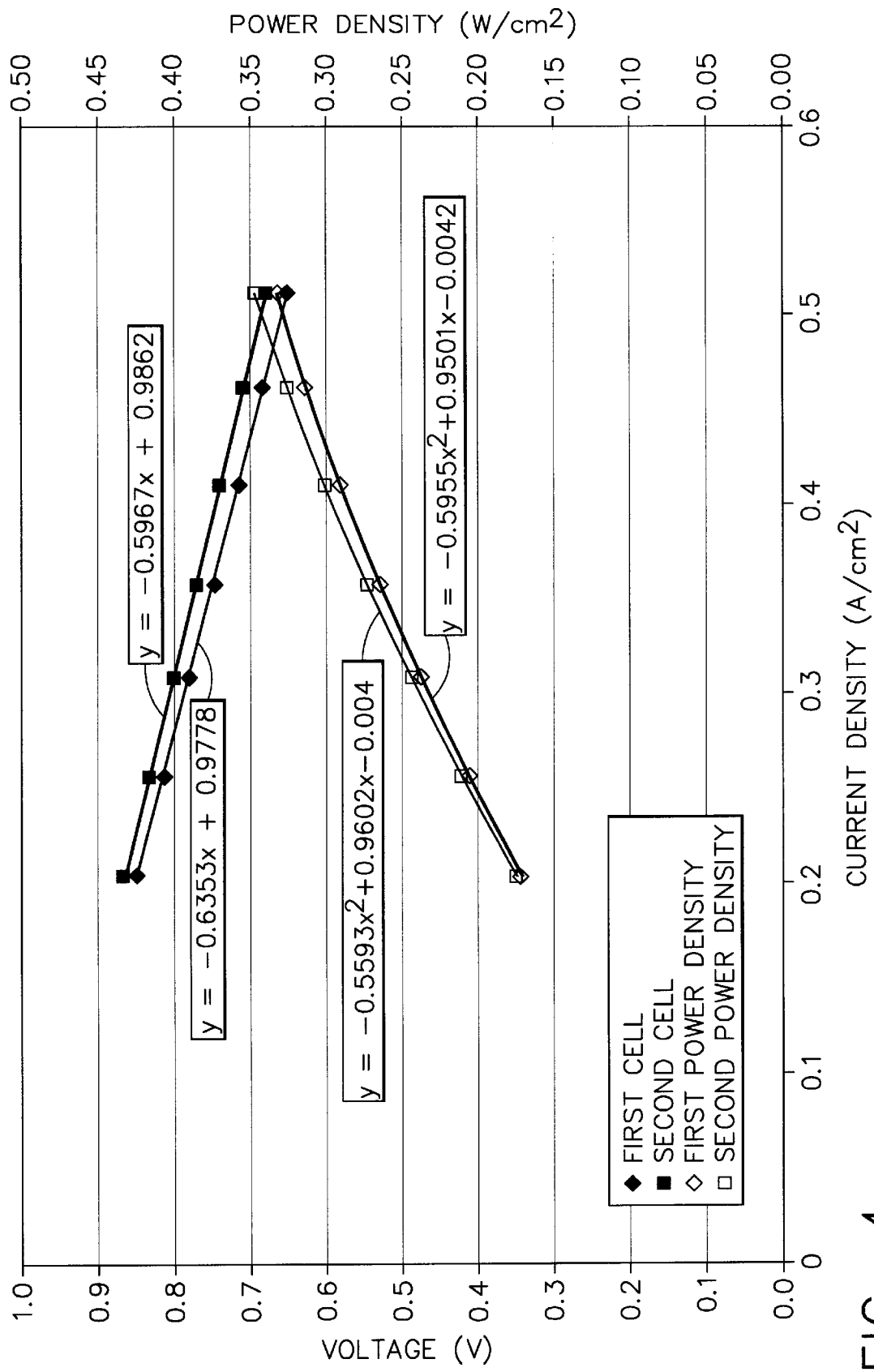
FIG. 4 is a graph comparing voltage, current density and power density characteristics of the cells in a two-cell fuel stack system as shown in FIG. 1.

After the anode reduction, stack 100 was placed under successively higher current loads and the cell voltage responses along with the corresponding power densities (PD) at start up is shown in FIG. 4. The continuous lines in the graph represent the regression fit to the experimental data. Estimates of the area specific resistance of each cell are given by the slope of the least squares lines and they are 0.6353 and 0.5967 $\Omega \cdot cm^2$ for the first and second cell, respectively. The corresponding maximum power densities for the cells of this example can be estimated from the regression equation for the power densities and are 383 and 416 $mW/cm^2$.

Figure 5:
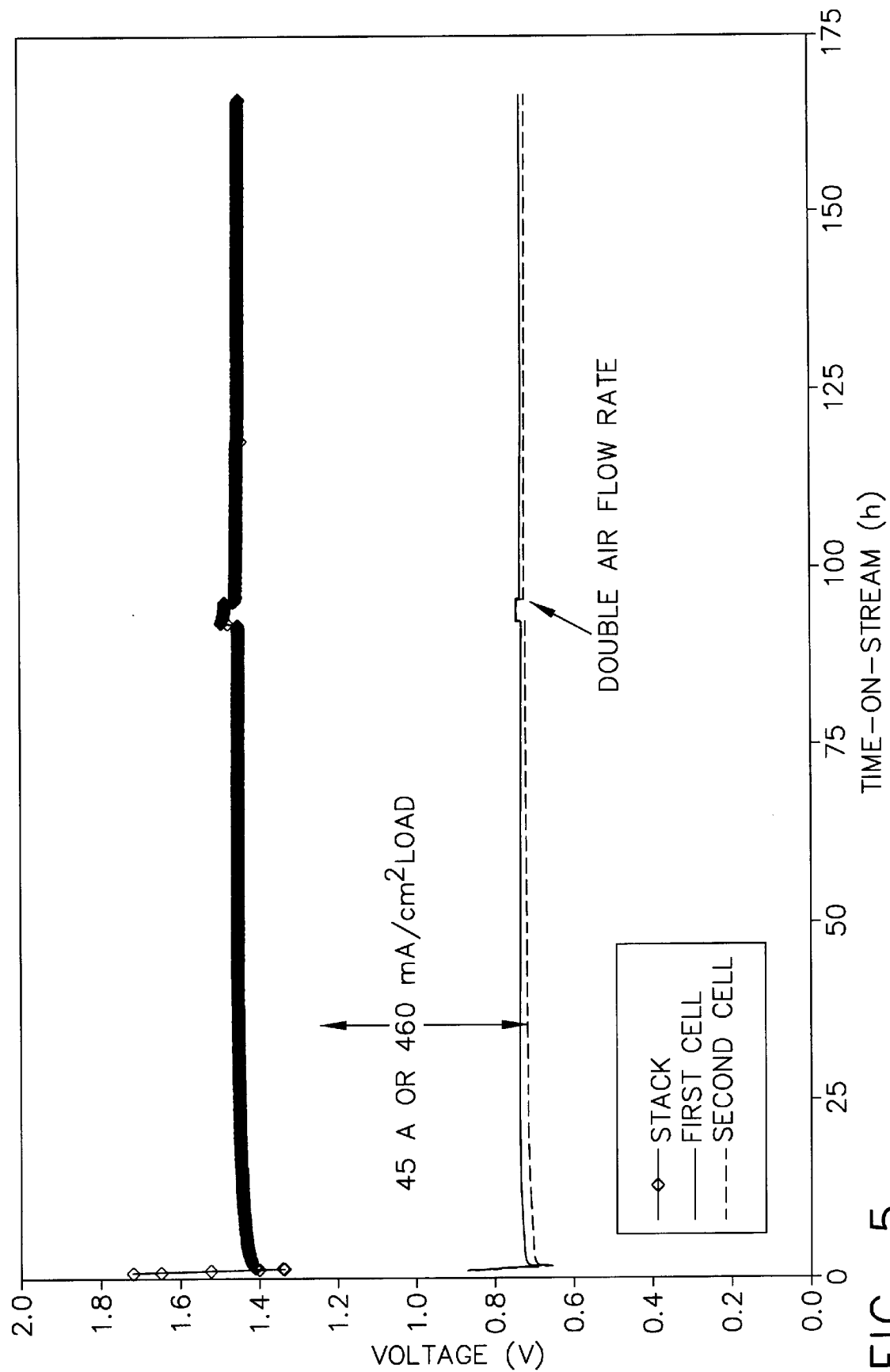
FIG. 5 is a graph comparing voltage characteristics of the cells and the two-cell stack under a current load of 45A over a certain period of time.

Stack 100 was then placed under a current load of 45 Amps (A), or 460 $mA/cm^2$, where mA denotes milliAmps, and the voltage responses for the stack and the cells are shown in FIG. 5 for the testing period of about 120 hours. The cell voltages improved over the first 60 hours of testing and were stable over the last 60 h. The voltages of the two cells started out somewhat different but were essentially the same over the last 50 hours of the test.

It should be understood, of course, that the foregoing relates to preferred embodiments of the invention and that modifications may be made without departing from the spirit and scope of the invention as set forth in the following claims.

We claim:

1. A fuel cell stack comprising:
   a first interconnect layer;
   a second interconnect layer;
   a continuous cell disposed between the first and second interconnect layers;
   a fuel supply member for supplying fuel into the first interconnect layer, the fuel supply member extends between a first outer edge and a first inner cavity of the first interconnect layer; and
   an oxidant gas supply member for supplying oxidant gas into the second interconnect layer, the oxidant gas supply member extends between a second outer edge and a second inner cavity of the second interconnect layer.

2. The fuel cell stack of claim 1, wherein the fuel supply member is connected to an external fuel manifold adjacent the first outer edge.

3. The fuel cell stack of claim 2, wherein the oxidant gas supply member is connected to an external oxidant gas manifold adjacent the second outer edge.

4. The fuel cell stack of claim 3, further comprising a first continuous separator plate supporting the first interconnect layer.

5. The fuel cell stack of claim 3, further comprising a second continuous separator plate supported by the second interconnect layer.

6. The fuel cell stack of claim 4, wherein the first, or bottom, continuous separator plate is a continuous end plate.

7. The fuel cell stack of claim 5, wherein the second, or top, continuous separator plate is a continuous end plate.

8. The fuel cell stack of claim 4, wherein the first interconnect layer comprises a top surface and a bottom surface.

9. The fuel cell stack of claim 5, wherein the second interconnect layer comprises a top surface and a bottom surface.

10. The fuel cell stack of claim 8, wherein the first inner cavity of the first interconnect layer is defined by a first inner wall of the first interconnect layer, and wherein the first inner wall connects a bottom opening in a bottom surface and a top opening in a top surface of the first interconnect layer.

11. The fuel cell stack of claim 9, wherein the second inner cavity of the second interconnect layer is defined by a second inner wall of the second permeable layer, and wherein the second inner wall connects a bottom opening in a bottom surface and a top opening in a top surface of the second interconnect layer.

12. The fuel cell stack of claim 10, wherein the first continuous separator end plate covers the bottom surface and the bottom opening in the bottom surface of the first interconnect layer and the cell covers the top surface and the top opening in the top surface of the first interconnect layer, thereby enclosing the first inner cavity of the first interconnect layer.

13. The fuel cell stack of claim 11, wherein the second continuous separator plate covers the top surface and the top opening in the top surface of the second interconnect layer and the cell covers the bottom surface and the bottom opening in the bottom surface of the second interconnect layer, thereby enclosing the second inner cavity of the second interconnect layer.

14. The fuel cell stack of claim 1, wherein the interconnect layers are fluid permeable.

15. The fuel cell stack of claim 1, further comprising a plurality of sequenced continuous cells, continuous separator plates, interconnects, fuel supply members, oxidant gas supply members, and two continuous end plates.

16. The fuel cell stack of claim 3, wherein each of the fuel and oxidant gas supply members is comprised of a distribution section and a tube section.

17. The fuel cell stack of claim 16, wherein the distribution section is a chamber defined by a side wall enclosed by upper and lower surfaces, and wherein a first end of the tube is connected to the side wall so as to establish fluid communication with the distribution section.

18. The fuel cell stack of claim 17, wherein the side wall is a porous side wall allowing oxidant gas or fuel passage from the chamber.

19. The fuel cell stack of claim 17, wherein the side wall is a circular side wall.

20. The fuel cell stack of claim 16, wherein the distribution section is a porous gas diffuser.

21. The fuel cell stack of claim 19, wherein the distribution section of the fluid supply member is placed into the inner cavity of the first interconnect layer.

22. The fuel cell stack of claim 21, wherein the tube of the fuel supply member is radially extended between the distribution section and the outer edge where a second end of the tube of the fuel supply member is connected to the external fuel supply manifold, thereby establishing fluid communication between the distribution section and the external fuel manifold so that the fuel from the fuel manifold is distributed by the distribution section into the first interconnect layer over essentially 360°.

23. The fuel cell stack of claim 19, wherein the distribution section of the oxidant gas supply member is placed into the inner cavity of the second interconnect layer.

24. The fuel cell stack of claim 23, wherein the tube of the oxidant gas supply member is radially extended between the distribution section and the outer edge where a second end of the tube of the oxidant gas supply member is connected to the external oxidant gas supply manifold, thereby establishing fluid communication between the distribution section and the external oxidant gas manifold so that the oxidant gas from the oxidant gas manifold is distributed by the distribution section into the second interconnect layer over essentially 360°.

25. The fuel cell stack of claim 1, wherein the first and second interconnect layers comprise circular shapes and wherein the first and the second inner cavities comprise circular shapes.

26. The fuel cell stack of claim 3, wherein the first interconnect is for the anode side of each cell in the stack system, and wherein the first interconnect is made of nickel foam.

27. The fuel cell stack of claim 17, wherein the tube is made of metal.

28. The fuel cell stack of claim 27, wherein the metal tube is electrically insulated with an insulation material.

29. The fuel cell stack of claim 26 wherein the insulation material is tubular ceramic.

30. A process for forming a fuel cell stack, comprising:
    providing a first interconnect layer having a first inner cavity;
    disposing a continuous cell over the first interconnect layer;
    disposing a second interconnect layer having a second inner cavity on the continuous cell;
    connecting the first inner cavity of the first interconnect layer to a fuel manifold located external to the fuel cell stack; and
    connecting the second inner cavity of the second interconnect layer to an oxidant gas manifold located external to the fuel cell stack.

31. The process of claim 30, further comprising disposing a first continuous end plate to the first interconnect.

32. The process of claim 30, further comprising disposing a second continuous end plate on the second interconnect layer.

33. The process of claim 31, further comprising:
    placing a fuel supply member in the first inner cavity of the first interconnect layer; and
    connecting the fuel supply member to the fuel manifold located external to the fuel cell stack, wherein the fuel supply member radially extends between the first inner cavity of the first interconnect layer and the fuel manifold.

34. The process of claim 33, further comprising supplying fuel to a distribution section of the fuel supply member, wherein the distribution section is fluid permeable.

35. The process of claim 34, further comprising distributing the fuel into the first interconnect layer through the distribution section of the fuel supply member.

36. The process of claim 31, further comprising:
placing an oxidant gas supply member in the second inner cavity of the second interconnect layer; and
connecting the oxidant gas supply member to the oxidant gas manifold located external to the fuel cell stack, wherein the oxidant gas supply member radially extends between the inner cavity of the second interconnect layer and the oxidant gas manifold.

37. The process of claim 36, further comprising supplying oxidant gas into a distribution section of the oxidant gas supply member, wherein the distribution section is fluid permeable.

38. The process of claim 37, further comprising distributing the oxidant gas into the second interconnect layer through the distribution section of the oxidant gas supply member.

* * * * *